United States Patent
Li et al.

(10) Patent No.: US 11,194,861 B2
(45) Date of Patent: Dec. 7, 2021

(54) GRAPH PARTITIONING METHOD AND APPARATUS

(71) Applicant: Huawei Technologies Co., Ltd., Guangdong (CN)

(72) Inventors: Zhenguo Li, Hong Kong (CN); Jiefeng Cheng, Shenzhen (CN); Zhihong Zhao, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 281 days.

(21) Appl. No.: 16/405,367

(22) Filed: May 7, 2019

(65) Prior Publication Data

US 2019/0266191 A1    Aug. 29, 2019

Related U.S. Application Data

(63) Continuation of application No. PCT/CN2017/103397, filed on Sep. 26, 2017.

(30) Foreign Application Priority Data

Nov. 8, 2016  (CN) .......................... 201610982455.7

(51) Int. Cl.
*G06F 16/00* (2019.01)
*G06F 16/901* (2019.01)
*G06F 16/90* (2019.01)

(52) U.S. Cl.
CPC .......... *G06F 16/9024* (2019.01); *G06F 16/90* (2019.01)

(58) Field of Classification Search
CPC ...... G06F 16/9024; G06F 16/00; G06F 16/90; G06F 16/2237
See application file for complete search history.

(56) References Cited

U.S. PATENT DOCUMENTS

| | | |
|---|---|---|
| 2012/0124194 A1 | 5/2012 | Shouraboura |
| 2016/0055184 A1 | 2/2016 | Fokoue-Nkoutche et al. |
| 2018/0279177 A1* | 9/2018 | Hurd .................... H04W 28/16 |

FOREIGN PATENT DOCUMENTS

| | | |
|---|---|---|
| CN | 1700211 A | 11/2005 |
| CN | 103345508 A | 10/2013 |

(Continued)

OTHER PUBLICATIONS

Verbelen et al., "Graph partitioning algorithms for optimizing software deployment in mobile cloud computing", Jul. 2012, ScienceDirect, pp. 451-459 (Year: 2012).*

(Continued)

*Primary Examiner* — Alexander Khong
(74) *Attorney, Agent, or Firm* — Womble Bond Dickinson (US) LLP (57) ABSTRACT

The method of the present disclosure includes: after a graph partitioning apparatus extracts an edge, first determining whether an aggregation degree between a currently extracted edge and an allocated edge in a first device satisfies a preset condition; then, when the preset condition is satisfied, determining whether a quantity of allocated edges stored in the first device is less than a first preset threshold; and allocating the currently extracted edge to the first device when the quantity is less than the first preset threshold. In this way, an aggregation degree between allocated edges in each device is relatively high and each device has relatively balanced load. When an edge changes and an edge associated with the particular edge needs to be synchronized, a relatively small quantity of devices need to perform synchronization and update, so that costs of communication between devices are reduced, and distributed graph computing efficiency is improved.

16 Claims, 3 Drawing Sheets

(56) References Cited

FOREIGN PATENT DOCUMENTS

CN 105912562 A 8/2016
JP 2004272369 A 9/2004

OTHER PUBLICATIONS

Johan Ugander et al: "Balanced label propagation for partitioning massive graphs", WSDM"13, Feb. 4, 2013, pp. 507-516, XP058050298.
Daniel Margo et al. A Scalable Distributed Graph Partitioner, Proceedings of the VLDB Endowment, vol. 8, No. 12, 2015. pp. 1478-1489.

* cited by examiner

GRAPH PARTITIONING METHOD AND APPARATUS

CROSS-REFERENCE TO RELATED APPLICATIONS

This application is a continuation of International Application No. PCT/CN2017/103397, filed on Sep. 26, 2017, which claims priority to Chinese Patent Application No. 201610982455.7, filed on Nov. 8, 2016, The disclosures of which are incorporated herein by reference in their entireties.

TECHNICAL FIELD

This application relates to the field of distributed graph computing, and in particular, to a graph partitioning method and apparatus.

BACKGROUND

Distributed graph computing is an important field of big data analysis, and is used to process large-scale graph data. Data of many fields is presented by using a graph. In form, one graph includes a plurality of vertices and edges. For example, in a social network, a user is a vertex of a graph, and a friendship between users is used as an edge of the graph. For another example, in e-commerce, a user and a commodity are vertices of a graph, and a behavior of user browsing and commodity purchase is used as an edge of the graph. For another example, in the Internet, a web page is used as a vertex of a graph, and a hyperlink between web pages is used as an edge of the graph. Other fields in which information is mainly presented as graph data further include the Internet of Things and a communications network.

Due to rapid development of these big data fields including the Internet, the Internet of Things, e-commerce, and the like, graph data increases sharply in scale (for example, a clue-web has 1 billion web pages and 42 billion hyperlinks). Therefore, a main challenge is how to efficiently process large-scale graph data to support graph-data-based data mining, analysis, and decision. A solution commonly used in the industry is a distributed graph computing system. The distributed graph computing system is intended to use cooperation performance of a device cluster (for example, a computer cluster) to partition to-be-processed graph data into a plurality of parts (each part may be referred to as a subgraph) and allocate the parts to different devices for parallel computing, so as to improve efficiency. However, to maintain computing status consistency, distributed graph computing requires a large amount of frequent communication between devices. To ensure computing correctness, a latest status obtained by each device by computing needs to be transferred to a device in which a subgraph adjacent ("adjacent" herein means that there is an overlapped vertex or edge) to a subgraph stored in each device is located. This results in high communication costs. Because most graph algorithms use an overall topology structure of a graph to improve a learning effect, computing for different subgraphs requires frequent computing status synchronization, leading to a large amount of communication between devices. Because subgraph computing of different devices is highly interdependent, the entire distributed graph computing has a large percentage of time (up to 80% to 90%) spent on communication between devices. Therefore, an important means to improve distributed graph computing efficiency is reducing communication costs.

In an existing graph partitioning method, edges in a graph are randomly allocated to different devices. Although the method achieves relatively high graph partitioning efficiency, a subgraph allocated to each device has a disadvantage of a high replication factor. The replication factor is a sum of quantities of vertices appearing in all machines divided by a total quantity of vertices in a graph (one vertex may appear in different machines). Therefore, a larger replication factor indicates that more devices need to perform status synchronization and update during status synchronization. As a result, communication costs are relatively high, and overall distributed graph computing efficiency is relatively low.

SUMMARY

This application provides a graph partitioning method and apparatus, to reduce costs of communication between devices, and improve distributed graph computing efficiency.

A first aspect of this application provides a graph partitioning method used to extract edges one by one from a graph and allocate the edges to a plurality of devices. The method is as follows:

First, an edge is extracted from randomly disordered edges in a memory. Then it is determined whether an aggregation degree between the currently extracted edge and an allocated edge in a first device that has been allocated an edge satisfies a preset condition. If the preset condition is satisfied, it indicates that the aggregation degree between the currently extracted edge and the allocated edge in the first device is relatively high, and the currently extracted edge is suitable to be allocated to the first device. If the preset condition is not satisfied, it indicates that the aggregation degree between the currently extracted edge and the allocated edge in the first device is relatively low, and the currently extracted edge is not suitable to be allocated to the first device. When the aggregation degree between the currently extracted edge and the allocated edge in the first device satisfies the preset condition, it is further determined whether a quantity of allocated edges stored in the first device is less than a first preset threshold. To make load of each device relatively balanced, the first preset threshold may be a proper quantity of allocated edges that is set by a graph partitioning apparatus for each device, and the quantity may be an average value obtained by dividing a total quantity of all edges by a quantity of devices participating in edge allocation. If the quantity of the allocated edges stored in the first device is greater than or equal to the first preset threshold, it indicates that the first device is not suitable to be further allocated an edge. If the quantity of the allocated edges stored in the first device is less than the first preset threshold, it indicates that the first device may further be allocated an edge, and the currently extracted edge is allocated to the first device. In this way, an aggregation degree between allocated edges in each device is relatively high, and when an edge changes and an edge associated with the particular edge needs to be synchronized, a relatively small quantity of devices need to perform synchronization and update, so that costs of communication between devices are reduced, and distributed graph computing efficiency is improved.

In one embodiment, the graph partitioning method may further include:

When the aggregation degree between the currently extracted edge and the allocated edge in the first device does not satisfy the preset condition, it indicates that the aggregation degree between the currently extracted edge and the allocated edge in the first device is not high, and the currently extracted edge is not suitable to be allocated to the first device. Therefore, the currently extracted edge may be temporarily cached to facilitate subsequent allocation to a proper device. In one embodiment, the currently extracted edge may be cached into an internal storage of the graph partitioning apparatus, such as a register, or memory, or a flash memory.

In another embodiment, the method further includes the following:

When a quantity of cached edges reaches a second preset threshold, some cached edges are allocated to a second device based on a preset rule, where the second device is a device that has not been allocated an edge.

When the register of the graph partitioning apparatus is full or a relatively large quantity of edges are cached in the graph partitioning apparatus, a cached edge may be allocated to a device that has not been allocated an edge. During the allocation, not all the cached edges are allocated to the second device. Instead, edges having a relatively high aggregation degree are selected and allocated to the second device based on the preset rule, and a remaining edge is still stored in the register, and waits for subsequent allocation. In this way, an aggregation degree between the edges allocated to the second device is also relatively high, costs of communication between devices are also reduced, and distributed graph computing efficiency is also improved.

In yet another embodiment, that some cached edges are allocated to a second device based on a preset rule may be as follows:

First, a first candidate vertex connected to a core vertex set is determined, where a smallest quantity of unallocated edges use the first candidate vertex as a vertex, the first candidate vertex is a vertex in a border vertex set, and the border vertex set includes the core vertex set. If the core vertex set is an empty set, a vertex is first randomly selected as the core vertex set, and a vertex adjacent to the core vertex is used as the border vertex set.

Then the first candidate vertex is added to the core vertex set, and a second candidate vertex is determined, where the second candidate vertex is adjacent to the first candidate vertex, and the second candidate vertex is located outside the border vertex set.

Then a first candidate edge is allocated to the second device, where the first candidate edge is an edge formed by the first candidate vertex and the second candidate vertex.

Then the second candidate vertex is added to the border vertex set.

When the border vertex set further includes another vertex adjacent to the second candidate vertex, an edge formed by the second candidate vertex and the another vertex is allocated to the second device.

The foregoing steps are cyclically performed, and when a quantity of edges allocated to the second device reaches a third preset threshold, allocation of a cached edge to the second device is suspended. In this way, edges allocated from the register to the second device are highly associated with each other, an aggregation degree between the edges is relatively high, and costs of communication between devices are reduced.

A second aspect of this application provides a graph partitioning apparatus configured to extract edges one by one from a graph and allocate the edges to a plurality of devices, where the graph partitioning apparatus includes a determining unit and an allocation unit.

The determining unit is configured to determine whether an aggregation degree between a currently extracted edge and an allocated edge in a first device that has been allocated an edge satisfies a preset condition. If the preset condition is satisfied, it indicates that the aggregation degree between the currently extracted edge and the allocated edge in the first device is relatively high, and the currently extracted edge is suitable to be allocated to the first device. If the preset condition is not satisfied, it indicates that the aggregation degree between the currently extracted edge and the allocated edge in the first device is relatively low, and the currently extracted edge is not suitable to be allocated to the first device.

In one embodiment, the determining unit is further configured to: when the aggregation degree between the currently extracted edge and the allocated edge in the first device satisfies the preset condition, determine whether a quantity of allocated edges stored in the first device is less than a first preset threshold. To make load of each device relatively balanced, the first preset threshold may be a proper quantity of allocated edges that is set by the graph partitioning apparatus for each device, and the quantity may be an average value obtained by dividing a total quantity of all edges by a quantity of devices participating in edge allocation. If the quantity of the allocated edges stored in the first device is greater than or equal to the first preset threshold, it indicates that the first device is not suitable to be further allocated an edge. If the quantity of the allocated edges stored in the first device is less than the first preset threshold, it indicates that the first device may further be allocated an edge.

The allocation unit is configured to allocate the currently extracted edge to the first device when the quantity of the allocated edges stored in the first device is less than the first preset threshold. In this way, an aggregation degree between allocated edges in each device is relatively high, and when an edge changes and an edge associated with the particular edge needs to be synchronized, a relatively small quantity of devices need to perform synchronization and update, so that costs of communication between devices are reduced, and distributed graph computing efficiency is improved.

A third aspect of this application provides a graph partitioning apparatus, configured to extract edges one by one from a graph and allocate the edges to a plurality of devices, where the apparatus includes: a transceiver, a memory storing a computer instruction, and a processor executing the computer instruction to implement the following graph partitioning method:

determining whether an aggregation degree between a currently extracted edge and an allocated edge in a first device satisfies a preset condition, where the first device is a device that has been allocated an edge;

when the aggregation degree between the currently extracted edge and the allocated edge in the first device satisfies the preset condition, determining whether a quantity of allocated edges stored in the first device is less than a first preset threshold; and allocating the currently extracted edge to the first device when the quantity of the allocated edges stored in the first device is less than the first preset threshold.

A fourth aspect of this application provides a storage medium storing program code, and when being executed, the program code performs the graph partitioning method provided in the first aspect or any implementation of the first aspect. The storage medium includes but is not limited to a flash memory, a hard disk drive (HDD), or a solid state drive (SSD).

It may be learned from the foregoing technical solutions that, in the embodiments of this application, after extracting the edge, the graph partitioning apparatus first determines whether the aggregation degree between the currently extracted edge and the allocated edge in the first device satisfies the preset condition; then, when the preset condition is satisfied, determines whether the quantity of the allocated edges stored in the first device is less than the first preset threshold; and allocates the currently extracted edge to the first device when the quantity is less than the first preset threshold. In this way, an aggregation degree between allocated edges in each device is relatively high and each device has relatively balanced load. When an edge changes and an edge associated with the particular edge needs to be synchronized, a relatively small quantity of devices need to perform synchronization and update, so that costs of communication between devices are reduced, and distributed graph computing efficiency is improved.

DESCRIPTION OF EMBODIMENTS

The embodiments of the present disclosure provide a graph partitioning method and apparatus, to reduce costs of communication between devices, and improve distributed graph computing efficiency.

The following clearly describes the technical solutions in the embodiments of the present disclosure with reference to the accompanying drawings in the embodiments of the present disclosure. Apparently, the described embodiments are merely some but not all of the embodiments of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way is interchangeable in proper circumstances, so that the embodiments of the present disclosure described herein can be implemented in orders other than the order illustrated or described herein. Moreover, the terms "include", "have", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
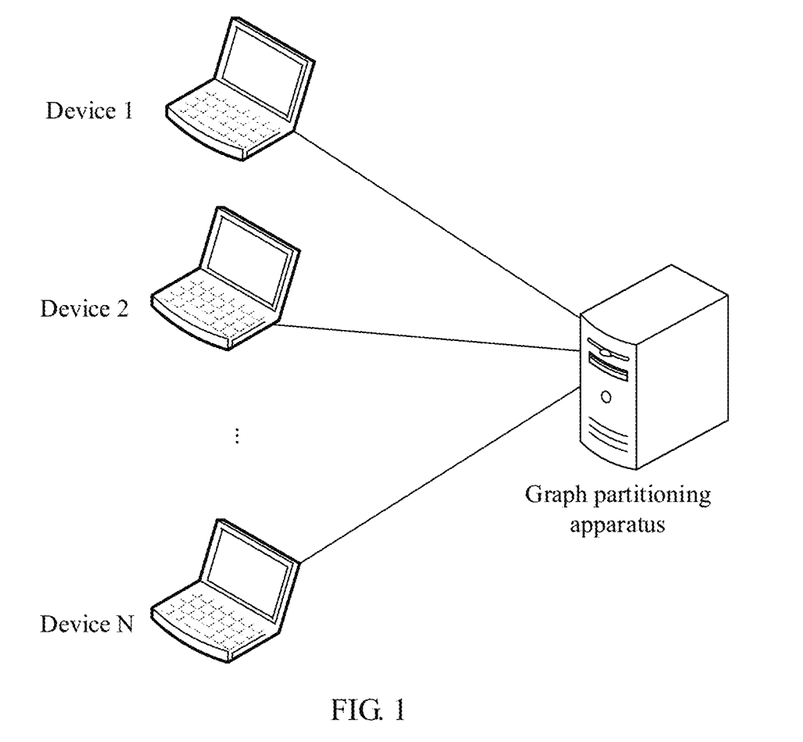
FIG. 1 is a schematic diagram of a system architecture to which a graph partitioning method is applied according one embodiment.

As shown in FIG. 1, FIG. 1 is a schematic diagram of a system architecture to which a graph partitioning method is applied according to one embodiment. The system architecture includes a plurality of devices and a graph partitioning apparatus. The graph partitioning apparatus and the devices may be homogeneous or heterogeneous. The graph partitioning apparatus may also be used as an object allocated an edge, like the plurality of devices. The plurality of devices are connected in a wired or wireless manner, and the graph partitioning apparatus is connected to the plurality of devices in a wired or wireless manner. The plurality of devices may be a device having intelligent computing and storage capabilities, such as a computer or a server, and the graph partitioning apparatus may also be a device having an intelligent graph partitioning capability, such as a computer or a server. The graph partitioning apparatus is configured to: first obtain an entire to-be-allocated graph, where the graph includes a plurality of edges, each edge has two vertices, and the graph partitioning apparatus extracts the edges one by one from the obtained to-be-allocated graph; then compare an aggregation degree between a currently extracted edge and an edge in a device that has been allocated an edge; and when the aggregation degree reaches a standard, allocate the currently extracted edge to the device. If the aggregation degree does not satisfy a standard, the graph partitioning apparatus may first cache the currently extracted edge into a register or another internal storage, and when a quantity of edges cached in the graph partitioning apparatus reaches a threshold, allocate the cached edges in batches to a device that has not been allocated an edge. In this way, an aggregation degree between allocated edges in each device is relatively high, and when an edge changes and an edge associated with the particular edge needs to be synchronized, it is very likely that internal synchronization and update are performed just in a device in which the edge is located, and even though other devices also need to perform synchronization and update, a quantity of devices needing to perform synchronization and update is relatively small, so that costs of communication between devices are reduced, and distributed graph computing efficiency is improved.

Figure 2:
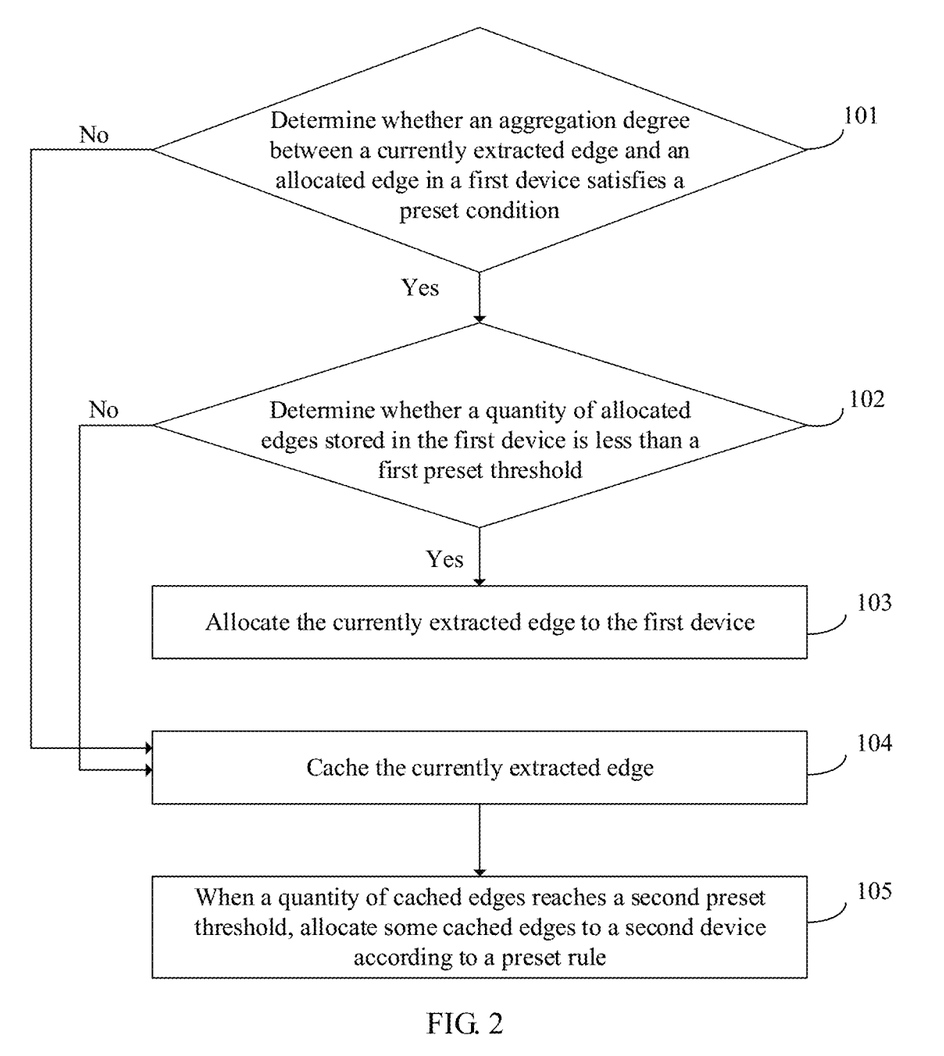
FIG. 2 is a schematic diagram of a graph partitioning method according to one embodiment.

Referring to FIG. 2, one embodiment of a graph partitioning method includes the following steps.

101. A graph partitioning apparatus determines whether an aggregation degree between a currently extracted edge and an allocated edge in a first device satisfies a preset condition. If yes, step 102 is performed. If no, step 104 is performed. The first device is a device that has been allocated an edge.

The graph partitioning apparatus may first obtain an entire to-be-allocated graph. Then the graph partitioning apparatus can obtain, by statistics collection, a quantity of edges and a quantity of vertices in the graph and a degree of each vertex, then extract all the edges one by one from the graph, and allocate each extracted edge to a corresponding device. When allocating the currently extracted edge, the graph partitioning apparatus first compares and determines the aggregation degree between the currently extracted edge and the edge in the first device that has been allocated an edge, and then correspondingly allocates the currently extracted edge depending on whether the aggregation degree satisfies the preset condition. Whether the aggregation degree satisfies the preset condition may be: Two vertices of the currently extracted edge both match vertices in the allocated edge in the first device. That is, the allocated edge stored in the first device has vertices the same as the two vertices of the currently extracted edge. It should be noted that, this is not limited only to that the currently extracted edge is the same as one of allocated edges stored in the first device, and it is also possible that one vertex of the currently extracted edge is the same as a vertex of a first edge in the first device, and the other vertex of the currently extracted edge is the same as a vertex of a second edge in the first device.

Alternatively, whether the aggregation degree satisfies the preset condition may be: One of vertices of the currently extracted edge matches a vertex in the allocated edge in the first device, and degrees of the two vertices of the currently extracted edge each are less than an average degree of vertices in the allocated edge in the first device. If only one vertex of the currently extracted edge appears in the edge stored in the first device, the degrees of the two vertices of the currently extracted edge and the average degree of the vertices in the first device need to be further determined. If the degrees of the two vertices of the currently extracted edge each are less than the average degree of the vertices in the first device, it indicates that the currently extracted edge does not have many association relationships, and update of the currently extracted edge is not very costly. Therefore, the currently extracted edge may also be allocated to the first device. If the currently extracted edge satisfies either of the foregoing two conditions, it indicates that the aggregation degree between the currently extracted edge and the edge stored in the first device is relatively high, and the currently extracted edge should be allocated to the first device. Therefore, when the currently extracted edge changes, an edge associated with the currently extracted edge is probably stored in the first device. In this case, only the edge associated with the currently extracted edge and stored in the first device needs to be updated, and communication costs of synchronization between devices are reduced.

In one embodiment, the graph partitioning apparatus may extract an edge from the cached edges, or from the obtained entire graph. If an edge is cached in a register in the graph partitioning apparatus, an edge may be preferentially extracted from the register. If the edge extracted from the register is allocated, the edge is deleted from the register. If the edge is not allocated successfully, the edge is still cached in the register. After all edges in the register are extracted, an edge may be extracted from the obtained entire graph. In one embodiment, to lower a replication factor, the graph partitioning apparatus may randomly extract an edge from the obtained entire graph. Alternatively, the graph partitioning apparatus first randomly disorders a topology structure of the obtained graph, and then sequentially extracts edges one by one from the disordered graph.

102. The graph partitioning apparatus determines whether a quantity of allocated edges stored in the first device is less than a first preset threshold. If yes, step 103 is performed. If no, step 104 is performed.

To make allocated edges of each device relatively even so that load of each device is relatively balanced, a first preset threshold may be set for each device. Before the graph partitioning apparatus allocates the currently extracted edge to the first device, the graph partitioning apparatus first determines that the quantity of the allocated edges stored in the first device is less than the first preset threshold. In this case, it indicates that the quantity of the edges stored in the first device has not reached a standard, and an edge may be further allocated to the first device. If the quantity of the allocated edges stored in the first device is greater than or equal to the first preset threshold, the first device does not need to be further allocated an edge, and the graph partitioning apparatus compares an aggregation degree between the currently extracted edge and an edge in another first device, and allocates the currently extracted edge to another device. In one embodiment, the first preset threshold may be set to an average value, that is, an average value obtained by dividing a quantity of edges of the entire graph by a quantity of devices participating in edge allocation. Alternatively, the first preset threshold may be customized based on performance and a requirement of each device. For example, a first device has relatively high performance, and a first preset threshold for the first device may be set to be greater than the average value; a second device has relatively low performance, and a first preset threshold for the second device may be set to be less than the average value.

In one embodiment, if a quantity of allocated edges in a first device has reached the first preset threshold, during aggregation degree comparison for the currently extracted edge, the graph partitioning apparatus may skip aggregation degree comparison with the first device. That is, when a quantity of allocated edges in a first device has reached a first preset threshold, the first device no longer participates in subsequent aggregation degree comparison and edge allocation processes.

103. The graph partitioning apparatus allocates the currently extracted edge to the first device.

If the aggregation degree between the currently extracted edge and the allocated edge in the first device satisfies the preset condition, the graph partitioning apparatus allocates the currently extracted edge to the first device. It should be noted that, the first device is not limited to one device, but means a device in all devices that has been allocated an edge, and the graph partitioning apparatus needs to compare the currently extracted edge with edges in all devices that have been allocated an edge one by one. For example, there are three devices that have been allocated an edge. Then the graph partitioning apparatus compares the currently extracted edge with edges in the three devices one by one. If an aggregation degree between an edge in a first device and the currently extracted edge does not satisfy the preset condition, the graph partitioning apparatus further compares the currently extracted edge with an edge in a second device. If an aggregation degree satisfies the preset condition, the currently extracted edge may be allocated to the second device, and does not need to be compared with an edge in a third device.

104. The graph partitioning apparatus caches the currently extracted edge.

When the aggregation degree between the currently extracted edge and the allocated edge in the first device does not satisfy the preset condition or the first device stores a relatively large quantity of allocated edges, the graph partitioning apparatus first caches the currently extracted edge. In one embodiment, the graph partitioning apparatus may cache the currently extracted edge into the register or another internal storage of the graph partitioning apparatus.

105. When a quantity of cached edges reaches a second preset threshold, the graph partitioning apparatus allocates some cached edges to a second device based on a preset rule, where the second device is a device that has not been allocated an edge.

Because the register has limited storage space, to avoid caching excessive unallocated edges in the graph partitioning apparatus, the graph partitioning apparatus further sets the second preset threshold. When a quantity of edges cached in the register in the graph partitioning apparatus reaches the second preset threshold, the edges in the register need to be allocated in batches. Because an aggregation degree between each edge cached in the register and the edge in the first device that has been allocated an edge does not satisfy the preset condition, the edges in the register are allocated in batches based on the rule to the second device that has not been allocated an edge.

In one embodiment, that the graph partitioning apparatus allocates some cached edges to a second device based on a preset rule may include:

determining, by the graph partitioning apparatus, a first candidate vertex connected to a core vertex set, where a smallest quantity of unallocated edges use the first candidate vertex as a vertex, the first candidate vertex is a vertex in a border vertex set, and the border vertex set includes the core vertex set;

adding, by the graph partitioning apparatus, the first candidate vertex to the core vertex set;

determining, by the graph partitioning apparatus, a second candidate vertex, where the second candidate vertex is adjacent to the first candidate vertex, and the second candidate vertex is located outside the border vertex set;

allocating, by the graph partitioning apparatus, a first candidate edge to the second device, where the first candidate edge is an edge formed by the first candidate vertex and the second candidate vertex;

adding, by the graph partitioning apparatus, the second candidate vertex to the border vertex set;

when the border vertex set further includes another vertex adjacent to the second candidate vertex, allocating, by the graph partitioning apparatus, an edge formed by the second candidate vertex and the another vertex to the second device; and when a quantity of edges allocated to the second device reaches a third preset threshold, suspending, by the graph partitioning apparatus, allocation of a cached edge to the second device.

An example is used below for description. Two sets: a core vertex set C and a border vertex set S may be maintained. First, a candidate vertex x is selected, and a specific selection formula may be:

$$x := \arg\min_{v \in S \setminus C} |N(v) \setminus S|$$

The selection formula means that a smallest quantity of unallocated edges use the candidate vertex x as a vertex. N(v) represents a set of vertices adjacent to a vertex v. In one embodiment, when C and S are empty sets (at the beginning) or C=S, a vertex is randomly selected from a graph cached in the register of the graph partitioning apparatus, the vertex is used as the core vertex set C, and all vertices adjacent to the vertex form the border vertex set S. Then a vertex is selected from the border vertex set according to the selection formula as the first candidate vertex x, then the first candidate vertex x is added to the core vertex set C, an edge outside the border vertex set S and adjacent to the first candidate vertex x is allocated to a current second device (Ei), then the border vertex set S is updated, and S=V(Ei) is used as a vertex set of a subgraph Ei, and to be specific, a vertex adjacent to the first candidate vertex x is added to the border vertex set S. Then it is determined whether the vertex newly added to the border vertex set S is adjacent to another vertex (other than vertices of an edge that has been allocated) in the border vertex set S, and if yes, an edge formed by the vertex newly added to the border vertex set S and the another adjacent vertex is allocated to the second device Ei. The foregoing steps are repeated until |Ei|>\alpha*|E|/p (\alpha>1, for example, \alpha=1.1). Then, edge allocation to the second device is suspended. E represents an edge set in the register after the first preset threshold is reached, and Ei represents a set of allocated edges in an $i^{th}$ device.

Figure 3:
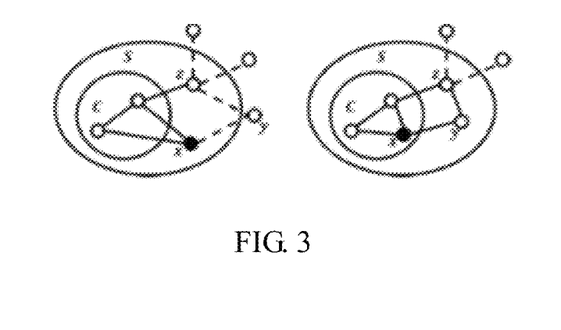
FIG. 3 is a schematic diagram of a specific example scenario of a graph partitioning method according to one embodiment.

As shown in FIG. 3, a small circle represents a vertex of a graph, a solid line represents an edge that has been allocated, a dashed line represents an unallocated edge, C is a core vertex set, and S is a border vertex set. In the left diagram of FIG. 3, C has two vertices that have been selected, vertices adjacent to the selected vertices are a vertex z and a vertex x, three unallocated edges are adjacent to the vertex z, and one unallocated edge is adjacent to the vertex x. Therefore, the vertex x is added to the core vertex set C (referring to the right diagram of FIG. 3), and then the core vertex set C includes three vertices including the vertex x. A vertex y is a vertex outside the border vertex set and adjacent to the vertex x, and an edge {x, y} is adjacent to the core vertex set. Therefore, the edge {x, y} is allocated to the current second device. The vertex y is added to the border vertex set S, so that the vertex z and the vertex y are both in the border vertex set S, and the vertex y is also adjacent to the vertex z in the border vertex set S. Therefore, an edge {z, y} is also allocated to the second device.

In one embodiment, after allocating the edge cached in the register to the second device, the graph partitioning apparatus deletes the edge from the register, so that capacity is reclaimed in the register to cache a newly extracted edge.

Figure 4:
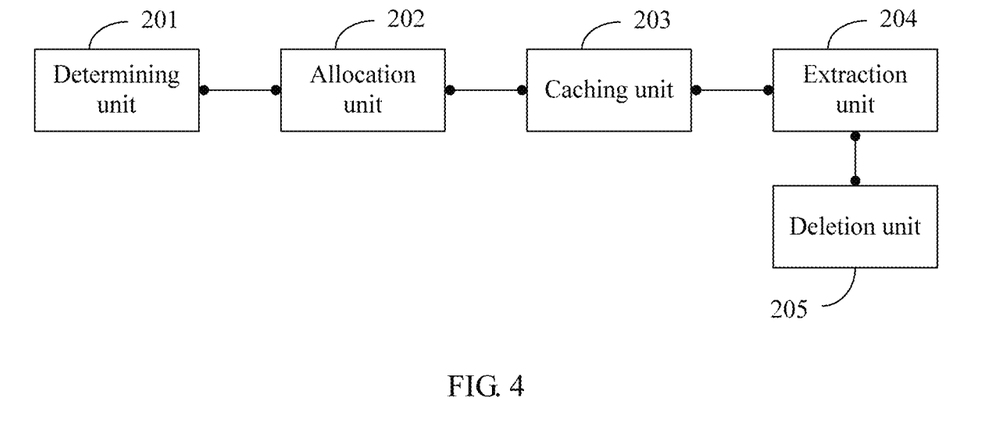
FIG. 4 is a schematic diagram of a graph partitioning apparatus according to one embodiment.

As shown in FIG. 4, FIG. 4 is a schematic diagram of a graph partitioning apparatus according to one embodiment. The apparatus is configured to extract edges one by one from a graph and allocate the edges to a plurality of devices, and includes:

a determining unit 201 configured to determine whether an aggregation degree between a currently extracted edge and an allocated edge in a first device satisfies a preset condition, where the first device is a device that has been allocated an edge, where the determining unit 201, in one embodiment, is further configured to: when the aggregation degree between the currently extracted edge and the allocated edge in the first device satisfies the preset condition, determine whether a quantity of allocated edges stored in the first device is less than a first preset threshold; and an allocation unit 202 configured to allocate the currently extracted edge to the first device when the quantity of the allocated edges stored in the first device is less than the first preset threshold.

In one embodiment, the preset condition includes:

two vertices of the currently extracted edge both match vertices in the allocated edge in the first device.

In one embodiment, the preset condition includes:

one of vertices of the currently extracted edge matches a vertex in the allocated edge in the first device, and degrees of two vertices of the currently extracted edge each are less than an average degree of vertices in the allocated edge in the first device.

In one embodiment, the apparatus further includes:

a caching unit 203 configured to cache the currently extracted edge when the aggregation degree between the currently extracted edge and the allocated edge in the first device does not satisfy the preset condition.

In one embodiment, the allocation unit 202 is further configured to:

when a quantity of cached edges reaches a second preset threshold, allocate some cached edges to a second device based on a preset rule, where the second device is a device that has not been allocated an edge.

In one embodiment, the allocation unit 202 is configured to:

determine a first candidate vertex connected to a core vertex set, where a smallest quantity of unallocated edges use the first candidate vertex as a vertex, the first candidate vertex is a vertex in a border vertex set, and the border vertex set includes the core vertex set;

add the first candidate vertex to the core vertex set;

determine a second candidate vertex, where the second candidate vertex is adjacent to the first candidate vertex, and the second candidate vertex is located outside the border vertex set;

allocate a first candidate edge to the second device, where the first candidate edge is an edge formed by the first candidate vertex and the second candidate vertex;

add the second candidate vertex to the border vertex set;

when the border vertex set further includes another vertex adjacent to the second candidate vertex, allocate an edge formed by the second candidate vertex and the another vertex to the second device; and when a quantity of edges allocated to the second device reaches a third preset threshold, suspend allocation of a cached edge to the second device.

In one embodiment, the apparatus further includes:

an extraction unit 204 configured to successively extract an edge from cached edges before the determining unit 201 determines whether the aggregation degree between the currently extracted edge and the allocated edge in the first device satisfies the preset condition; and a deletion unit 205 configured to delete the currently extracted edge from the cached edges after the currently extracted edge is allocated to the first device.

In one embodiment, the extraction unit 204 is further configured to successively or randomly extract an edge from an obtained graph before the determining unit determines whether the aggregation degree between the currently extracted edge and the allocated edge in the first device satisfies the preset condition.

For specific descriptions of units in the embodiment of FIG. 4, refer to a detailed description of the graph partitioning method provided in the embodiment of FIG. 2. Details are not described herein again.

Figure 5:
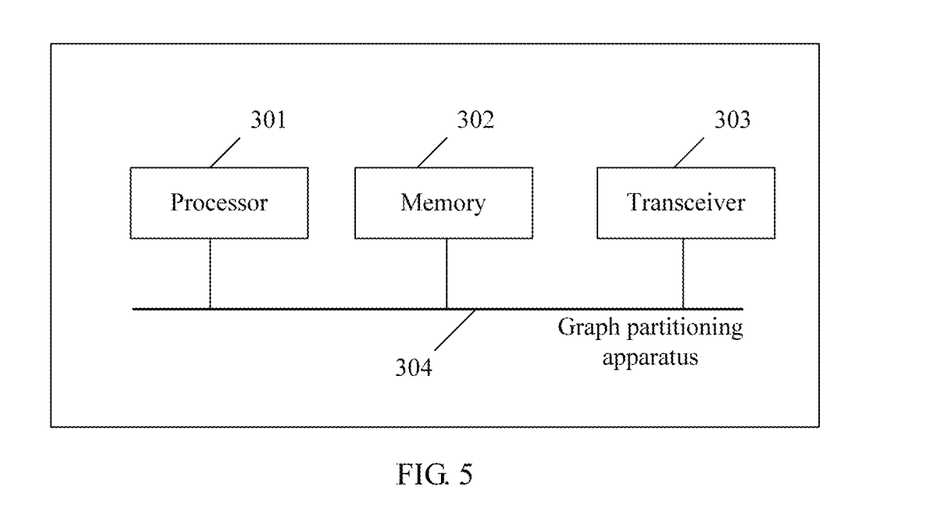
FIG. 5 is another schematic diagram of a graph partitioning apparatus according to one embodiment.

The graph partitioning apparatus in the embodiment of FIG. 4 further has an embodiment in another form. As shown in FIG. 5, the graph partitioning apparatus includes: a processor 301, a memory 302, and a transceiver 303. The processor 301, the memory 302, and the transceiver 303 are connected by using a bus 304. The transceiver 303 may include a transmitter and a receiver. The memory 302 stores a computer instruction. The processor 301 executes the computer instruction to implement a function in the graph partitioning method in the embodiment of FIG. 2. Various flexible design manners may be used for specific implementation. For functions of parts, further refer to the method embodiment. No limitation is set in the present disclosure.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method of graph partitioning, the method being used to extract edges from a graph and to allocate the edges to a plurality of devices, the method comprising:

determining whether an aggregation degree between a currently extracted edge and an allocated edge in a first device satisfies a preset condition, wherein the first device is a device that has been allocated an edge;

when the aggregation degree between the currently extracted edge and the allocated edge in the first device satisfies the preset condition, determining whether a quantity of allocated edges stored in the first device is less than a first preset threshold; and allocating the currently extracted edge to the first device when the quantity of the allocated edges stored in the first device is less than the first preset threshold;

wherein the preset condition comprises one vertex of the currently extracted edge that matches a vertex in the allocated edge in the first device, and degrees of two vertices of the currently extracted edge wherein each degree is less than an average degree of vertices in the allocated edge in the first device.

2. The method according to claim 1, further comprising:
caching the currently extracted edge when the aggregation degree between the currently extracted edge and the allocated edge in the first device does not satisfy the preset condition.

3. The method according to claim 2, further comprising:
when a quantity of cached edges reaches a second preset threshold, allocating some cached edges to a second device based on a preset rule, wherein the second device is a device that has not been allocated an edge.

4. The method according to claim 3, wherein allocating some cached edges to the second device comprises:
determining a first candidate vertex connected to a core vertex set, wherein a smallest quantity of unallocated edges use the first candidate vertex as a vertex, the first candidate vertex is a vertex in a border vertex set, and the border vertex set comprises the core vertex set;
adding the first candidate vertex to the core vertex set;
determining a second candidate vertex that is adjacent to the first candidate vertex, wherein the second candidate vertex is located outside the border vertex set;
allocating a first candidate edge to the second device, wherein the first candidate edge is an edge formed by the first candidate vertex and the second candidate vertex;
adding the second candidate vertex to the border vertex set;
when the border vertex set further comprises another vertex adjacent to the second candidate vertex, allocating an edge formed by the second candidate vertex and the other vertex adjacent to the second candidate vertex; and
when a quantity of edges allocated to the second device reaches a third preset threshold, suspending allocation of a cached edge to the second device.

5. The method according to claim 1, further comprising:
before determining whether the aggregation degree between the currently extracted edge and the allocated edge in the first device satisfies the preset condition,
successively extracting an edge from cached edges; and
deleting the currently extracted edge from the cached edges after the currently extracted edge is allocated to the first device.

6. The method according to claim 1, further comprising:
before determining whether the aggregation degree between the currently extracted edge and the allocated edge in the first device satisfies the preset condition,
successively or randomly extracting an edge from an obtained graph.

7. An apparatus for graph partitioning, the apparatus configured to extract edges from a graph and allocate the edges to a plurality of devices, wherein the apparatus comprises:
a processor;
a memory coupled to the processor to store instructions, which when executed by the processor, cause the processor to:
determine whether an aggregation degree between a currently extracted edge and an allocated edge in a first device satisfies a preset condition, wherein the first device is a device that has been allocated an edge;
when the aggregation degree between the currently extracted edge and the allocated edge in the first device satisfies the preset condition, determine whether a quantity of allocated edges stored in the first device is less than a first preset threshold; and
allocate the currently extracted edge to the first device when the quantity of the allocated edges stored in the first device is less than the first preset threshold;
wherein the preset condition comprises one vertex of the currently extracted edge that matches a vertex in the allocated edge in the first device, and degrees of two vertices of the currently extracted edge wherein each degree is less than an average degree of vertices in the allocated edge in the first device.

8. The apparatus according to claim 7, wherein the instructions, which when executed by the processor, further cause the processor to:
cache the currently extracted edge when the aggregation degree between the currently extracted edge and the allocated edge in the first device does not satisfy the preset condition.

9. The apparatus according to claim 8, wherein the instructions, which when executed by the processor, further cause the processor to:
when a quantity of cached edges reaches a second preset threshold, allocate some cached edges to a second device based on a preset rule, wherein the second device is a device that has not been allocated an edge.

10. The apparatus according to claim 9, wherein to allocate some cached edges to the second device, the instructions, which when executed by the processor, cause the processor to:
determine a first candidate vertex connected to a core vertex set, wherein a smallest quantity of unallocated edges use the first candidate vertex as a vertex, the first candidate vertex is a vertex in a border vertex set, and the border vertex set comprises the core vertex set;
add the first candidate vertex to the core vertex set;
determine a second candidate vertex that is adjacent to the first candidate vertex, wherein the second candidate vertex is located outside the border vertex set;
allocate a first candidate edge to the second device, wherein the first candidate edge is an edge formed by the first candidate vertex and the second candidate vertex;
add the second candidate vertex to the border vertex set;
when the border vertex set further comprises another vertex adjacent to the second candidate vertex, allocate an edge formed by the second candidate vertex and the other vertex adjacent to the second candidate vertex; and
when a quantity of edges allocated to the second device reaches a third preset threshold, suspend allocation of a cached edge to the second device.

11. The apparatus according to claim 7, wherein the instructions, which when executed by the processor, further cause the processor to:
successively extract an edge from cached edges before the determining unit determines whether the aggregation degree between the currently extracted edge and the allocated edge in the first device satisfies the preset condition; and
delete the currently extracted edge from the cached edges after the currently extracted edge is allocated to the first device.

12. The apparatus according to claim 7, wherein the instructions, which when executed by the processor, further cause the processor to:
successively or randomly extract an edge from an obtained graph before the determining unit determines whether the aggregation degree between the currently extracted edge and the allocated edge in the first device satisfies the preset condition.

13. A non-transitory machine-readable medium having instructions stored therein, which when executed by a processor, cause the processor to perform operations, the operations comprising:
   determining whether an aggregation degree between a currently extracted edge and an allocated edge in a first device satisfies a preset condition, wherein the first device is a device that has been allocated an edge;
   when the aggregation degree between the currently extracted edge and the allocated edge in the first device satisfies the preset condition, determining whether a quantity of allocated edges stored in the first device is less than a first preset threshold; and
   allocating the currently extracted edge to the first device when the quantity of the allocated edges stored in the first device is less than the first preset threshold;
   wherein the preset condition comprises one vertex of the currently extracted edge that matches a vertex in the allocated edge in the first device, and degrees of two vertices of the currently extracted edge wherein each degree is less than an average degree of vertices in the allocated edge in the first device.

14. The non-transitory machine-readable medium of claim 13, wherein the operations further comprise:
   caching the currently extracted edge when the aggregation degree between the currently extracted edge and the allocated edge in the first device does not satisfy the preset condition.

15. The non-transitory machine-readable medium of claim 14, wherein the operations further comprise:
   when a quantity of cached edges reaches a second preset threshold, allocating some cached edges to a second device based on a preset rule, wherein the second device is a device that has not been allocated an edge.

16. The non-transitory machine-readable medium of claim 13, wherein the operations further comprise: before determining whether the aggregation degree between the currently extracted edge and the allocated edge in the first device satisfies the preset condition,
   successively extracting an edge from cached edges; and
   deleting the currently extracted edge from the cached edges after the currently extracted edge is allocated to the first device.

* * * * *